United States Patent [19]

Endom

[11] Patent Number: 4,708,294

[45] Date of Patent: Nov. 24, 1987

[54] METHOD AND APPARATUS FOR CONDITIONING THE FLOOR OF A POULTRY REARING AREA

[76] Inventor: Edward F. Endom, P.O. Box 543, Ellisville, Miss. 39437

[21] Appl. No.: 304,333

[22] Filed: Sep. 21, 1981

[51] Int. Cl.⁴ ............................................. B02C 21/02
[52] U.S. Cl. ........................................ 241/27; 119/22; 299/36; 241/30; 241/101.7; 241/189 R; 404/91
[58] Field of Search ................... 241/30, 101.7, 186 R, 241/194, 189 R, 195, 27; 15/93 R, 4, 93 B; 299/36; 119/22, 27, 28

[56] References Cited

U.S. PATENT DOCUMENTS

| | | | |
|---|---|---|---|
| 2,663,555 | 12/1953 | Milliken | 119/22 X |
| 2,768,794 | 10/1956 | Putnam | 299/36 X |
| 3,263,257 | 8/1966 | Stapleton, Sr. | 119/22 X |
| 3,826,436 | 7/1974 | Cetrulo | 241/194 X |
| 3,881,707 | 5/1975 | Toto | 241/101.7 |
| 4,052,011 | 10/1977 | Burkhart et al. | 241/101.7 X |
| 4,619,412 | 10/1986 | Willingham | 241/101.7 |

FOREIGN PATENT DOCUMENTS 2400714  7/1974  Fed. Rep. of Germany ... 241/101.7

*Primary Examiner*—Mark Rosenbaum
*Attorney, Agent, or Firm*—Brisebois & Kruger

[57] ABSTRACT

The floor of a poultry rearing area is conditioned for reuse for raising a new batch of chicks, by revitalizing the litter and droppings on the floor of the area. This a accomplished by scraping the litter from the floor with an elongated blade, so that the litter is lifted upwardly into the path of a power driven rotary pulverizer, which pulverizes the litter and droppings, and permits the so conditioned litter to fall back onto the floor for immediate reuse. The scraper blade is maintained at or slightly above the level of the floor, as the litter is scraped, to avoid damage to the floor.

16 Claims, 6 Drawing Figures

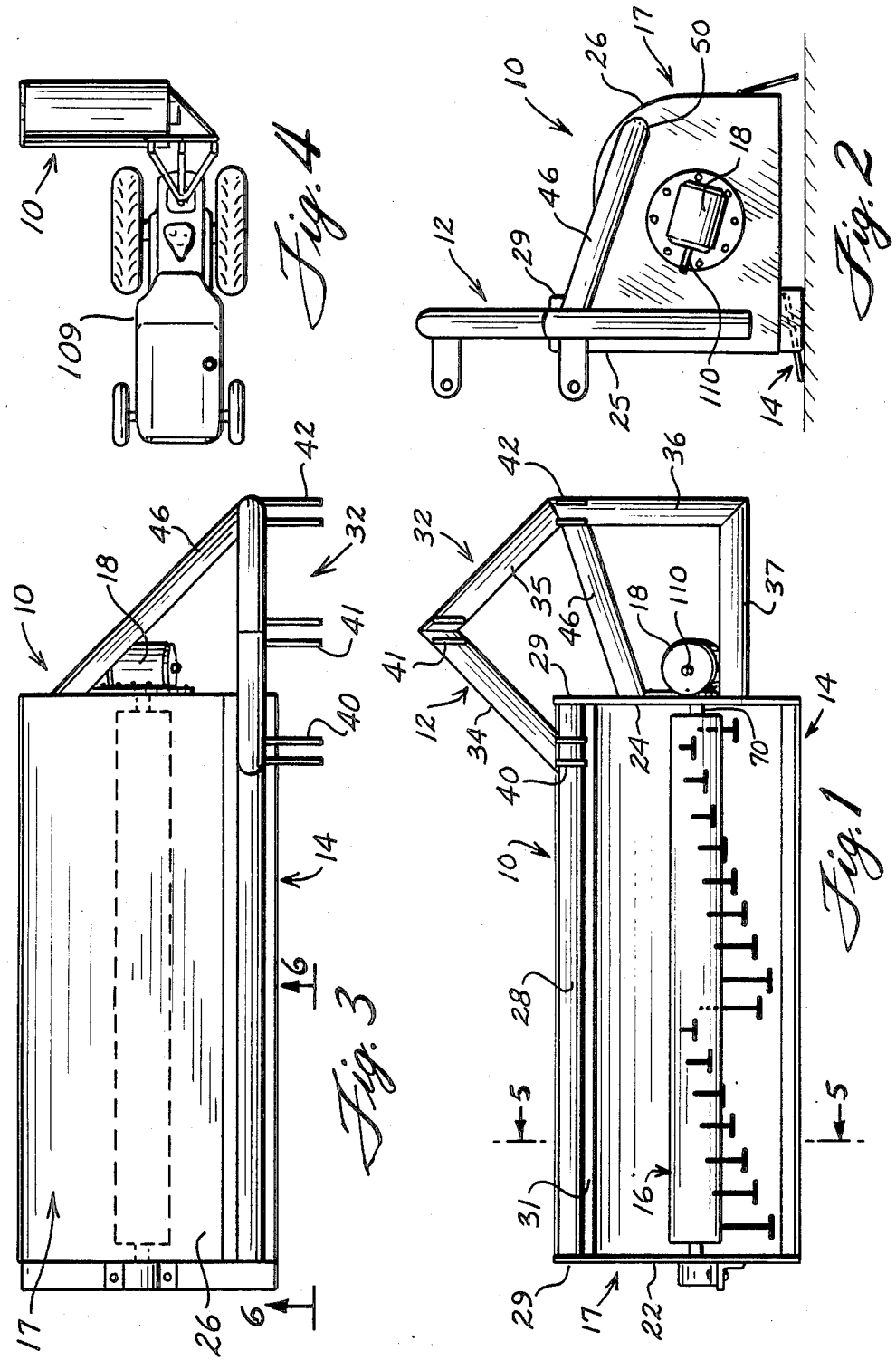

METHOD AND APPARATUS FOR CONDITIONING THE FLOOR OF A POULTRY REARING AREA

This invention relates generally to a method and apparatus for conditioning the floor of a poultry rearing area for reuse, and more specifically to a method and apparatus for revitalizing and conditioning litter on the floor of a poultry rearing area for use.

BACKGROUND OF THE INVENTION

Raising poultry, particularly broiler chickens, is a major industry in the United States of America today. A typical chicken house can be 360 feet long and 40 feet wide. Such chicken houses, especially in the Southern states where below freezing temperatures are rare, typically take the form of shelters having a roof and open sides. The floor of the poultry raising area is simply compacted and levelled earth which extends the length and width of the chicken house.

It is customary to provide such chicken houses or shelters with roll-down curtains to cover the open sides especially when there is rain accompanied by wind, to both protect the chickens and to prevent extensive wetting of the floor of the raising area.

Despite these precautions, the floor of the raising area frequently becomes wet either from rain or from drinking water spilled by the poultry. Also, poultry droppings if permitted to fall directly to the earth would adhere, making it difficult to clean the droppings from the floor without also removing some of the floor surface, which has the disadvantage, after repeated cleanings of lowering the surface below the surrounding grade so that rain water would tend to flood and accumulate. Further, an earth floor per se is unhealthy for the poultry.

As a result, it has been the custom in the past to provide a layer of litter on the floor of the poultry raising area of a depth of perhaps several inches. Of the various litters used in the past, sawdust has been found to be the most satisfactory because of its ability to absorb moisture from the chicken droppings thereby causing them to dry reasonably quickly, and also has the ability to surface dry quite quickly if the sawdust becomes wet from rain or spilled drinking water. Another reason for using sawdust is that the sawdust provides a relatively soft cover on the earth floor and can be scraped from the floor to clean the chicken house.

With present farming methods chicks grow to broiler size in approximately seven weeks. After each batch of chickens is removed, the floor of the chicken raising area must be prepared for a new batch of chicks.

After seven weeks, a great deal of droppings accumulate on the floor in large cakes, and these cakes must be eliminated. In the past, when sawdust was inexpensive and available, the sawdust and caked droppings would be scraped off for example, with a bulldozer type scraper blade and the scraped material would simply be pushed to one end of the chicken raising area and hauled away, and a new layer of fresh sawdust was then spread on the floor. However, sawdust is now quite expensive and frequently unavailable, because of its extensive use in the manufacture of composition board for use as a substitute for natural lumber, which has become very expensive. Correspondingly, this previous technique of simply scraping the spent litter from the floor together with the droppings is no longer ecomonical, and is frequently not possible because of the unavailability of replacement sawdust.

SUMMARY OF THE INVENTION

In accordance with applicant's invention, it has been found that the spent sawdust caked with droppings can be revitalized for reuse by breaking up the caked droppings on the sawdust into very small pieces or particles having a texture like earth. At the same time, the droppings are mixed with the sawdust thereby providing a relatively soft surface which is water pervious and generally has the same characteristics as the original sawdust litter. By virtue of this technique, the sawdust litter can be reused many times, and if it is ultimately desired or necessary to replace the litter with fresh sawdust, the removed litter can be used as an excellent rich fertilizer.

In accordance with applicant's invention, the litter and caked droppings on the floor of the chicken raising area are revitalized and pulverized or broken up into fine particles in a very simple and economical manner using relatively inexpensive apparatus. This is accomplished in accordance with the invention, by scraping the litter from the floor with a blade, so that the litter is lifted upwardly into the path of a rotating pulverizer which disintegrates the material to the necessary fine pulverant form and permits the so-conditioned or revitalized litter to fall back onto the floor in its conditioned state, to be reused immediately by a new batch of chicks.

The apparatus according to the invention and which is used to practice the method, takes the form of a relatively simple and inexpensive implement which can be connected to virtually any tractor having a three-point hitch connection and a power take-off. The apparatus has a blade at the front of the frame, a rotary pulverizer within a housing on the frame, and a transmission for connecting the rotary pulverizer to the power take-off the tractor. As the apparatus is moved across the floor, an angled scraper blade scrapes the caked material from the floor along an upwardly inclined path into the path of pulverizing elements on the rotary drum. These elements break up and pulverize any caked material, and the so pulverized material simply falls downwardly beneath the rotary pulverizer so that it is redeposited on the floor of the area in a conditioned or revitalized state which is satisfactory for raising a new batch of baby chicks. The pulverizing elements are preferably hammer elements connected to the drum for pivotal movement circumferentially of the drum.

In its preferred form the apparatus is off-set with respect to the longitudinal center of the tractor so that one side of this pulverizer-conditioner extends laterally beyond the side of the tractor. Such an arrangement permits scraping and revitalizing the caked litter even in tight corners of the chicken rearing area. If desired, a hinged plate leveler which levels the conditioned litter can be provided at the rear of the apparatus. This leveler also functions as a protective shield to prevent scattering the material rearwardly of the apparatus.

A further unique feature of the apparatus is a unique ground engaging support which maintains the scraper blade at a level always at or slightly above the level of the permanent floor of the chicken raising area so that there is no danger whatever of cutting away or removing any of the permanent floor, be it earth or some other material. Correspondingly, the apparatus can be used by even very inexperienced personnel, the only requirement being that they are capable of operating the tractor and its three-point hitch.

Numerous other advantages, features, and objects of this invention will become evident with reference to the accompanying drawings and the detailed description which follows.

BRIEF DESCRIPTION OF DRAWINGS

FIG. 1 is a front view in elevation of a poultry floor conditioning apparatus according to the invention;

FIG. 2 is a right hand end view of the apparatus of FIG. 1;

FIG. 3 is a top plan view of the apparatus of FIG. 1;

FIG. 4 is a schematic view showing the apparatus of FIG. 1 mounted on a tractor;

DETAILED DESCRIPTION

Figure 5:
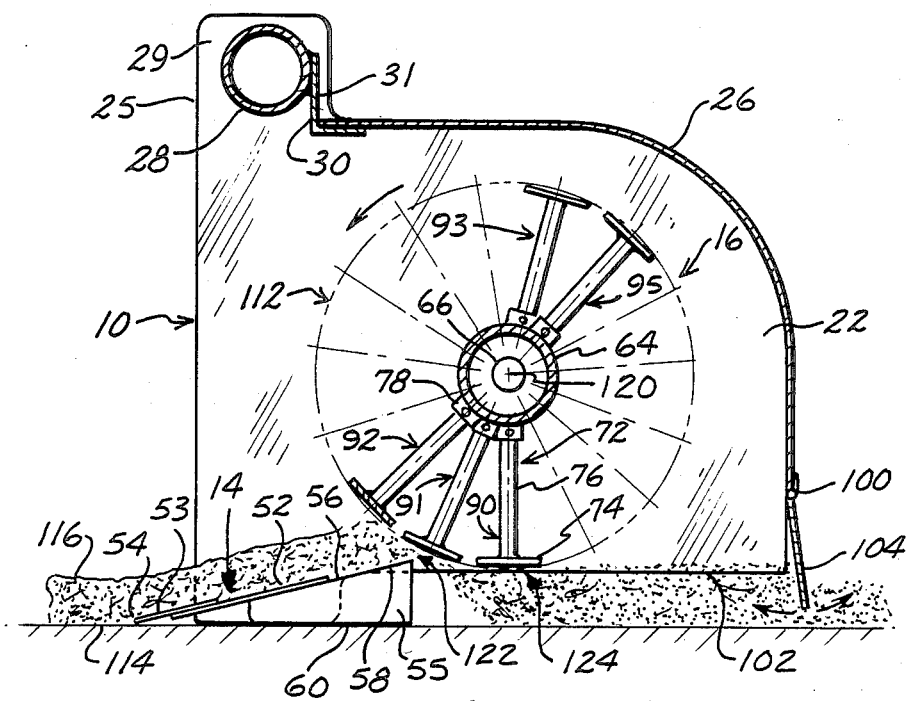
FIG. 5 is an enlarged partial view in section taken along line 5—5 of FIG. 1.

The apparatus shown at FIGS. 1-3 represents a preferred embodiment of the apparatus according to the invention for conditioning the floor of a poultry rearing area, and for practicing the method according to the invention.

The poultry floor conditioning apparatus 10, according to the invention, takes the form of a unit adapted to be connected to, and to be pulled and powered by a farm tractor as shown schematically at FIG. 4. As shown at FIGS. 1-3, conditioning apparatus 10 is composed of a frame 12 which supports the component parts of the apparatus, a scraper blade assembly 14 for scraping litter from the floor of the chicken rearing area as the conditioning apparatus is moved forwardly by a tractor, and a rotary disintegrator or pulverizer 16 disposed behind blade 14 within a partly enclosing housing 17 and which disintegrates, pulverizes and otherwise breaks up the litter scraped from the floor by the blade assembly 14. This rotary disintegrator 16 is driven from the power take-off of the tractor via a right angle gear drive unit 18.

The conditioner unit 10 is primarily of fabricated and welded construction, with the exception of the right angle gear drive unit 18, which is a commercially available 90° gear drive, capable of transmitting 40 horsepower, and having a 1:2 drive ratio, so that the rotary disintegrator 16 is driven at a speed twice the speed of rotation of the power take-off shaft of the tractor.

Housing 17 includes parallel sides 22 and 24, in the form of metal plates, which are spaced apart and vertical, and enclose the sides of the space in which the disintegrator 16 is located. A sheet metal hood or cover 26 extends between the upper edges of the sides 22 and 24. Hood 26 is bent to curve downwardly and follow the contour of the rear portion of these sides. This hood is welded to the top and rear edges of the sides and partly encloses the region where the rotary disintegrator 16 is located. Extending between the sides 22 and 24 near their upper front edges 25 is a horizontal beam or pipe 28 the ends of which are welded respectively to upwardly projecting portions 29 of the side plates 22 and 24. The front edge 30 of hood 26 can be welded to pipe 28 along its length, or alternatively, can be welded to the horizontal leg of a length of angle iron 31 having its vertical leg welded to pipe 28, and its its ends welded to sides 22, 24 (FIG. 5).

A hitch assembly 32 is composed of lengths of pipe 34-37 which lie in a common vertical plane which includes the pipe 28. These pipe sections 34-37 are welded together at their mating ends so that the hitch assembly 32 is off-set to one side of conditioner apparatus 10.

Pairs of clevis ears 40-42 are welded to the hitch assembly 32 to provide for mounting conditioner apparatus 10 on the three point hitch of a tractor. The openings through these sets of ears have their center lines in a common vertical plane when conditioner apparatus 10 is in its working attitude as shown at FIG. 2.

The hitch assembly 32 is connected to the conditioner by welding pipe 34 to pipe 28, and welding an end of pipe 37 to side plate 24. In addition, the hitch assembly, includes a support brace in the form of a pipe 46 which is welded near the upper end of pipe 36 where clevis ears 42 are located and extends diagonally, rearwardly, and downwardly where its other end 50 is welded to side plate 24 at a position slightly above gear drive unit 18.

Scraper blade assembly 14 is a steel blade which extends the entire distance between side walls 22 and 24. As shown at FIG. 5, a rear portion of this blade is formed of a heavy steel plate 52 of ½ inch thickness, whereas a front portion of the blade is formed of thinner plate 53, such as 3/16th steel plate, the leading edge 54 of which can be hardened. These plates are overlapped as shown at FIG. 5 and welded together.

Welded to the underside of the heavy plate 52 are a plurality of vertical support plates 55 which have a bevelled top edge 56 conforming to the slope of the blade. A rear portion 58 of each support plate extends beyond the rear edge of the heavy plate 52 to guide material scraped from the floor toward the disintegrator 16. The bottom edges 60 of these support plates are coplanar with the leading edge of the scraper blade so that the support plates support the blade at the level of the base floor of the chicken rearing area to prevent gouging or cutting into this base floor when conditioner apparatus 10 is in use. The blade makes a shallow angle with the plane of the floor which is preferably at an angle of about 15° with respect to the plane of the floor.

The disintegrator takes the form of a rotary drum 64 with plural disintegrator elements in spaced apart relation to each other and evenly distributed around and along the length of the drum. The drum 64 is preferably a length of pipe slightly shorter than the distance between the side plates 22 and 24. A stub shaft 66 is welded to a plug inserted in one end of the drum so the shaft is aligned with the drum. This shaft 66 extends through a bearing 68 mounted on an angle 69 fixed to side plate 22, and supports one end of the drum for rotation (see FIG. 6).

A plug inserted in the other end of the drum and secured, for example by welding, has a central opening of an appropriate configuration to receive the output shaft 70 of the gear drive unit 18. The output shaft is secured to this end of the drum by either welding or by using a suitable key and set screw to connect the output shaft to the drum. In this manner, drum 64 is mounted to be driven in rotation by the gear drive unit 18.

Mounted on drum 64 are a plurality of disintegrator elements, each in the form of a hammer 72. Each hammer is composed of a head 74 welded to an end of an elongated arm 76. Head 74 is preferably a square metal plate, and arm 76 is a rectangular bar.

Figure 6:
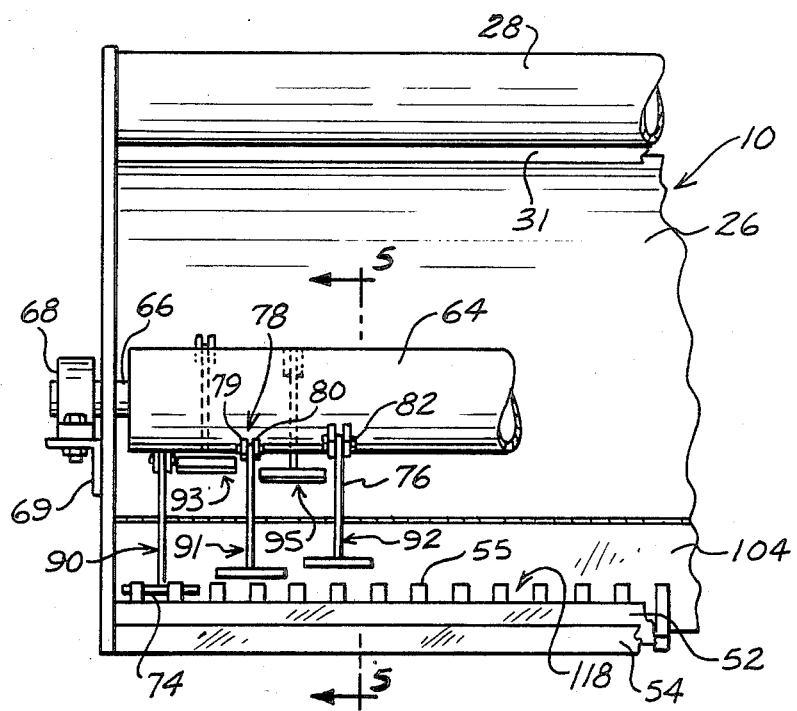
FIG. 6 is a partial view taken along line 6—6 of FIG. 3, and shows a front view of the scraper blade and rotary pulverizer.

Welded to the outside of drum 64 and distributed evenly along its periphery and length are sets of hammer-connecting ears 78. Each set of ears is composed of an ear 79 and an ear 80, and the ears of each set are spaced apart a distance slightly greater than the thickness of arm 76, as shown at FIG. 6. Aligned openings through the ears of each set permit connecting hammer 72 to the drum by inserting a bolt or pin 82 through the ears and an opening at the free end of arm 76. When a bolt is used to so pivotally mount a hammer, a jam nut can be used to secure the bolt, thereby facilitating replacing the hammer if it becomes worn.

In the embodiment shown, drum 64 is sixty inches long, each hammer head 74 is a three inch square plate, and twenty-nine hammers are distributed around the periphery of the drum.

The connecting ears 78 are fastened to the drum 64 along two helical paths which are diametrically opposite each other and follow the path of a double screw thread. The ears 78 of a first hammer 90, at the left end of the drum are so positioned and secured to drum 64, that the arm of hammer 90 pivots in a plane perpendicular to the axis of the drum and two inches from the end of the drum. A second hammer 91 is spaced four inches from hammer 90 in a direction axially of the drum but is also offset clockwise, as viewed from the drive gear end of the drum, 1/15 of the circumference of the drum (24° circumferentially) from the first hammer 90. A third hammer 92 is similarly spaced four inches from hammer 91 axially of the drum and is also offset clockwise 24° from hammer 91. This spacing of hammers is continued along the length of the drum to mount fifteen hammers along a first helix which makes essentially one complete turn from one end of the drum to the other. The last hammer at the right hand of the drum being two inches from this end and 336° circumferentially (clockwise) from hammer 90.

At the diametrically opposite side of the drum, a first hammer 93 of a second helical path is spaced four inches from the end of the drum but is at a position 8/15 of the circumference of the drum (192°) clockwise from hammer 90. A second hammer 95 on the rear of the drum (and which is along the second helix) is 8/15 the circumference of the drum (192°) clockwise from hammer 91, and is spaced four inches axially of the drum from the hammer 93. This spacing is continued along the second helix to mount fourteen hammers along this helix. The last hammer of the second helix is four inches from the right hand end of the drum and is 13/15 of the circumference of the drum (322°) clockwise of hammer 93 (the first hammer on the second helix). This results in an array of hammers around and along the length of the drum such that the heads 74 of adjacent hammers on the same helical path are spaced apart axially of the drum and cannot engage or interfere with each other. However, midway between each pair of hammers on one helical path is a hammer of the other helical path, see for example, hammers 90, 91, and hammer 93, which is midway between them axially of the drum but is at the opposite side of the drum. The head of hammer 93 overlaps, and in essence, fills the spaces between the heads of hammers 90 and 91. By virtue of this arrangement there are no axial spaces between hammer heads 74, and good disintegration of litter directed in the path of the hammers is assured.

As shown at FIGS. 2, 5, and 6, hood 26 terminates at a hinge 100 which is somewhat above the bottom edges 102 of side plates 22 and 24. Pivotally connected to hood 26 at hinge 100 is a shield and leveler plate 104, which extends the width of the hood 26. The bottom edge of the leveler plate 104 is below edges 102 of the side plate, when leveler plate 104 is in the generally vertical position as shown at FIGS. 2 and 5.

The purpose of leveler plate 104 is to prevent excess scattering of the litter disintegrated by the hammers of disintegrator 16, when the conditioning apparatus 10 is in operation.

OPERATION

In operation, conditioner unit 10 is connected to the three point hitch of a tractor 109, in the manner shown at FIG. 4. This connection includes connecting the input shaft 110 of the gear unit 18 to the power takeoff of the tractor.

When the power takeoff of the tractor is engaged, disintegrator 16 is rotated at a speed twice the speed of rotation of the tractor power takeoff shaft (because of the 1:2 ratio of gear unit 18), a preferred speed of rotation of disintegrator 16 being on the order of 750 r.p.m. At such a speed of rotation, the hammers 72 pivotally connected to drum 64 extend fully outwardly so that the heads 74 of the hammers move along a circular path 112 shown in phantom lines on FIG. 5.

As shown at FIG. 5, the floor 114 of the chicken rearing area is coated with a relatively thick layer of litter and droppings 116. The three point hitch of the tractor is lowered so that conditioning apparatus 10 is lowered into engagement with the litter. By virtue of the three point hitch arrangement, the conditioning apparatus is maintained in the generally vertical attitude shown at FIGS. 2 and 5 where the front edges of the side plates are generally perpendicular to the plane of floor 114. Upon forward movement of the tractor, front edge 54 of the blade assembly 14 penetrates the litter 116 until the bottom edges 60 of the plates 55 reach the level of the floor or grade 114. These bottom edges prevent conditioning apparatus 10 and blade assembly 14 from penetrating to a level lower than floor 114 so that the original grade or floor 114 remains intact and is not gouged or otherwise damaged by the blade.

Continued forward motion of the tractor and conditioning apparatus 10 causes the litter 116 to be scraped from the floor and to ride upwardly over the blade assembly, as shown at FIG. 5. Any small broken portions or fines of this litter tend to sift back onto the floor 114 through the spaces 118 (FIG. 6) between the vertical plates 55. The caked material however, is directed into the path 112 of the hammer heads 74 and is struck by the heads and pulverized or disintegrated, the hammer heads throwing the material rearwardly toward the rear of hood 26, and the deflector-leveler plate 104. The so-disintegrated or pulverized material falls on the floor 114 into the space beneath the disintegrator.

As shown at FIG. 5, the axis of rotation 120 of drum 64 is behind the top rear corner 122 of plates 55 and the circular path 112 of the hammer heads 74 just clears corner 122 and has a low point 124 which is behind and below this corner. However, the low point 124 of circular path 112 is above the leading edge 54 of scraper blade 14 to assure that the hammers cannot engage the floor 114, which could gouge or damage the floor.

Of course, the double helical array of the hammers provides a rotary disintegrator which is sufficiently balanced to avoid any significant vibration.

In the preferred embodiment described, each hammer arm 76 is formed from rectangular stell bar stock ¼"

thick and 1½" wide, and is 5" long, each hammer is a 3"×3" square plate ¼" thick, and ears 79, 80 are each 1¼"×1½" plate which is 3/16" thick. Drum 64 is a steel pipe of 4" nominal diameter having an outside diameter of about 4½".

The three point hitch assembly 32 provides for mounting the conditioner unit 10 in offset relation to tractor 109, so that one side of the unit 10 extends laterally beyond the side of the tractor as shown at FIG. 4. This arrangement permits clearing and conditioning litter in regions close to obstructions such as walls or roof supports.

Using the apparatus according to this invention, it is possible to totally recondition and revitalize litter on the floor of a poultry rearing area on the order of 340 feet long and 70 feet wide in slightly over two hours. Several uses of this apparatus have indicated that it is durable and long-lasting, and no situations were encountered in which the floor of the poultry area 114 was damaged by using this apparatus.

While a preferred embodiment has been shown and described, it is to be understood that numerous changes can be made withouderparting from the scope of this invention.

I claim:

1. A method of revitalizing and conditioning for reuse, litter on the floor of a poultry raising area, comprising the steps of, positioning an elongated scraper blade at an acute angle to the plane of the floor of the area, with a leading edge of the blade at the elevation of the floor of the area to scrape litter from the floor, moving the scraper blade across the floor to scrape litter from the floor and to cause the scraped litter to move over the blade, maintaining the leading edge of the scraper blade at the elevation of the floor during the step of scraping to scrape the litter from the floor without damaging the floor, continually pulverizing the litter which moves over the blade with a rotary power driven pulverizer at a predetermined position with respect to the path of travel of the litter scraped by the blade, and discharging the so conditioned and pulverized litter onto the floor of the poultry raising area.

2. A method according to claim 1 wherein said step of discharging comprises allowing the pulverized litter to fall back onto the floor.

3. A method according to claim 1 wherein said step of moving the scraper blade comprises moving the blade with a farm tractor.

4. A method according to claim 1 wherein said step of maintaining the leading edge of the blade at the elevation of the floor comprises supporting the blade on a support engaging and slidable across the floor.

5. A method according to claim 1 wherein said step of pulverizing the litter comprises pulverizing the litter with a rotary pulverizer having a plurality of hammer elements connected to a rotary drum for pivotal movement in radial planes relative to the drum.

6. Poultry rearing area floor conditioning apparatus comprising a frame adapted to be moved along the floor to be conditioned;
means for scraping litter from said floor in response to movement of the frame along the floor, said means comprising
an elongated scraper blade extending transversely of and fixed to said frame and disposed at an acute angle to the plane of the floor;
a rotary disintegrator including disintegrator menas for disintegrating litter scraped from the floor,
means mounting said disintegrator on said frame for rotation about an axis sufficiently above the floor that the disintegrator means moves along a circular path above the floor;
said scraper blade directing litter scraped from the floor into the path of the disintegrator means; and
means for rotating the disintegrator.

7. Apparatus according to claim 6 further comprising a casing on said frame, said casing extending at least partially around said rotary disintegrator.

8. Apparatus according to claim 6 further comprising support means on said frame for supporting said frame on the floor with said blade at the level of the floor.

9. Apparatus according to claim 8 wherein said support means comprises, slide means engageable with and slidable on the floor.

10. Apparatus according to claim 9 wherein said slide means comprises, a plurality of slide elements spaced apart along the width of the apparatus.

11. Apparatus according to claim 6 wherein said means for directing scraped litter into the path of the disintegrator means comprises, a surface fixed with respect to a leading edge of the scraper blade, and disposed above and behind said leading edge.

12. Apparatus according to claim 6 wherein said disintegrator means comprises, a plurality of disintegrator elements mounted on a rotary drum for movement in radial planes relative to the drum.

13. Apparatus according to claim 12 wherein said disintegrator elements comprise a plurality of hammer elements pivotally connected to the drum in spaced apart relation to each other axially and circumferentially of the drum.

14. Apparatus according to claim 13 wherein each hammer element comprises a rigid arm, a hammer fixed to one end of the arm, and means at the other end of the arm for pivotally connecting the hammer element to the drum.

15. Apparatus according to claim 6 wherein said means for rotating said disintegrator comprises, a gear drive assembly having an output connected to the disintegrator and an input adapted to be connected to a power take off of a farm tractor.

16. Apparatus according to claim 6 further comprising means on said frame for connecting said frame to a farm tractor, and means for rotating said disintegrator from a power take off of the tractor.

* * * * *